(12) United States Patent
Kounavis et al.

(10) Patent No.: US 10,949,358 B2
(45) Date of Patent: Mar. 16, 2021

(54) SECURE ADDRESS TRANSLATION SERVICES USING MESSAGE AUTHENTICATION CODES AND INVALIDATION TRACKING

(71) Applicant: Intel Corporation, Santa Clara, CA (US)

(72) Inventors: Michael Kounavis, Portland, OR (US); David Koufaty, Portland, OR (US); Anna Trikalinou, Hillsboro, OR (US); Rupin Vakharwala, Hillsboro, OR (US)

(73) Assignee: INTEL CORPORATON, Santa Clara, CA (US)

( * ) Notice: Subject to any disclaimer, the term of this patent is extended or adjusted under 35 U.S.C. 154(b) by 0 days.

(21) Appl. No.: 16/582,919

(22) Filed: Sep. 25, 2019

(65) Prior Publication Data

US 2020/0026661 A1    Jan. 23, 2020

(51) Int. Cl.
   *G06F 12/14*      (2006.01)
   *G06F 12/1081*    (2016.01)
   *G06F 12/1027*    (2016.01)
   *G06F 12/0831*    (2016.01)
   *G11C 15/04*      (2006.01)
   *G06F 12/0868*    (2016.01)

(52) U.S. Cl.
   CPC ...... *G06F 12/1027* (2013.01); *G06F 12/0835* (2013.01); *G06F 12/0868* (2013.01); *G06F 12/1425* (2013.01); *G06F 12/1458* (2013.01); *G06F 12/1466* (2013.01); *G06F 12/1483* (2013.01); *G11C 15/04* (2013.01); *G06F 12/1081* (2013.01); *G06F 2212/1052* (2013.01); *G06F 2212/151* (2013.01); *G06F 2212/683* (2013.01)

(58) Field of Classification Search
   CPC ............ G06F 12/1458; G06F 12/1466; G06F 12/1483; G06F 2212/151; G06F 2212/1052
   See application file for complete search history.

(56) References Cited

U.S. PATENT DOCUMENTS

2016/0344731 A1* 11/2016 Serebrin ............. G06F 12/1475

* cited by examiner

*Primary Examiner* — Tracy A Warren
(74) *Attorney, Agent, or Firm* — Jaffery Watson Mendonsa & Hamilton LLP

(57) ABSTRACT

Embodiments are directed to providing a secure address translation service. An embodiment of a system includes a memory for storage of data, an Input/Output Memory Management Unit (IOMMU) coupled to the memory via a host-to-device link the IOMMU to perform operations, comprising receiving a memory access request from a remote device via a host-to-device link, wherein the memory access request comprises a host physical address (HPA) that identifies a physical address within the memory pertaining to the memory access request and a first message authentication code (MAC), generating a second message authentication code (MAC) using the host physical address received with the memory access request and a private key associated with the remote device, and performing at least one of allowing the memory access to proceed when the first MAC and the second MAC match and the HPA is not in an invalidation tracking table (ITT) maintained by the IOMMU; or blocking the memory operation when the first MAC and the second MAC do not match.

18 Claims, 14 Drawing Sheets

SECURE ADDRESS TRANSLATION SERVICES USING MESSAGE AUTHENTICATION CODES AND INVALIDATION TRACKING

TECHNICAL FIELD

Embodiments described herein generally relate to the field of memory address translation and memory protection and, more particularly to a translation agent (e.g., an input/output memory management unit (IOMMU)) providing a secure address translation service based on a context of a requesting device.

BACKGROUND

Most modern computer systems use memory virtualization for optimal memory usage and security. Traditionally, Peripheral Component Interconnect Express (PCIe) devices would only observe untranslated addresses, instead of a Host Physical Addresses (HPA), and would therefore send a read or write request to a host device with a given untranslated address. On the host side, the processor's IOMMU would receive a read/write request from a device, translate the specified address to an HPA and complete the device's memory access request (i.e., read/write). In order to isolate devices only to specific addresses, software would program the device and the IOMMU to use untranslated address that are, for example, a Virtual Addresses (VA) or an Input/Output Virtual Address (IOVA). The HPA is the physical address used to access all platform resources, after all address translations have taken place, including any translation from Guest Physical Address (GPA) to HPA in a virtualized environment, and it is usually referred simply as a Physical Address (PA) in a non-virtualized environment.

Address Translation Services (ATS) is an extension to the PCIe protocol. The current version of ATS is part of the PCIe specification, currently 4.0, which is maintained by the PCI Special Interest Group (PCI-SIG) and which can be accessed by members at https://pcisig.com/specifications/may be referred to herein as the "ATS Specification." Among other things, ATS allows devices to cache address translations and to handle page faults (traditional PCIe devices required memory pinning), which facilitates support for a variety of performance features, including Device Translation Lookaside Buffer (Dev-TLB) and Shared Virtual Memory. ATS also provides support for cache-coherent links like Computer Express Link (CXL) that operate exclusively on physical address. ATS allows a PCIe device to request address translations, from VA to HPA, from a translation agent (e.g., the IOMMU). This capability allows the device to store the resulting translations internally in a Dev-TLB, also referred to by the ATS Specification as an address translation cache (ATC), and directly use the resulting HPA to subsequently access main memory, via a host-to-device link (e.g., a PCIe interface or a cache-coherent interface (e.g., CXL, NVLink, and Cache Coherent Interconnect for Accelerators (CCIX)). As such, ATS splits a legacy PCIe memory access into multiple stages, including (i) a Translation Request in which the device requests a translation for a VA to a HPA; (ii) a Translated Request in which the device requests a read/write with a given HPA; and (iii) an optional Page Request in which the device makes a request to the IOMMU for a new page to be allocated for it after a failed Translation Request.

At present, ATS performs limited security checks on translation requests and translated requests, but these checks are insufficient to protect against a malicious ATS device.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are directed to providing a secure address translation service by a translation agent based on message authentication codes (MACs) and invalidation tracking.

The ATS Specification provides checks on every ATS Translated Request with an HPA to verify (i) the device that sent the memory access request is enabled by the system software to use ATS; and (ii) the HPA is not part of a system protected range (e.g., an Intel® Software Guard Extensions (SGX) Protected Memory Range (PRMRR) region). While these checks allow the system software to check the device manufacturer of the device before allowing a requested memory operation and to verify that highly-sensitive system regions are protected from an ATS device, all other memory (e.g., ring −1, ring 0, ring 3 code/data) remains vulnerable and without device authentication, device manufacturer information can be easily forged by an attacker. In addition, device authentication cannot guarantee the proper behavior of a device (e.g., a Field Programmable Gate Array (FPGA)) with reconfigurable hardware logic. Therefore, those skilled in the art will recognize the current ATS definition has a security vulnerability. Specifically, a malicious ATS device can send a Translated Request with an arbitrary HPA and perform a read/write to that HPA, without first asking for a translation or permission from the trusted system, such as the IOMMU.

Another layer of protection provided by modern processors may include an architecture and instruction set architecture (ISA) extensions, which includes per-domain encryption keys. A domain can be a Virtual Machine (VM) running inside a Virtual Machine Monitor (VMM). However, if ATS is enabled, a malicious ATS device that is not trusted by any domain, can still write to any HPA with the wrong key, which can result in memory corruption and/or be used as part of a Denial of Service attack on a domain. Meanwhile, if the domain chooses to disable ATS for a particular device, then that particular device would be incompatible with cache-coherent links and would be incompatible with other host performance features like Shared Virtual Memory and VMM Overcommit. As such, without the improvements described herein, software vendors would be faced with a choice between performance and security.

Example Computing Environment

Figure 1:
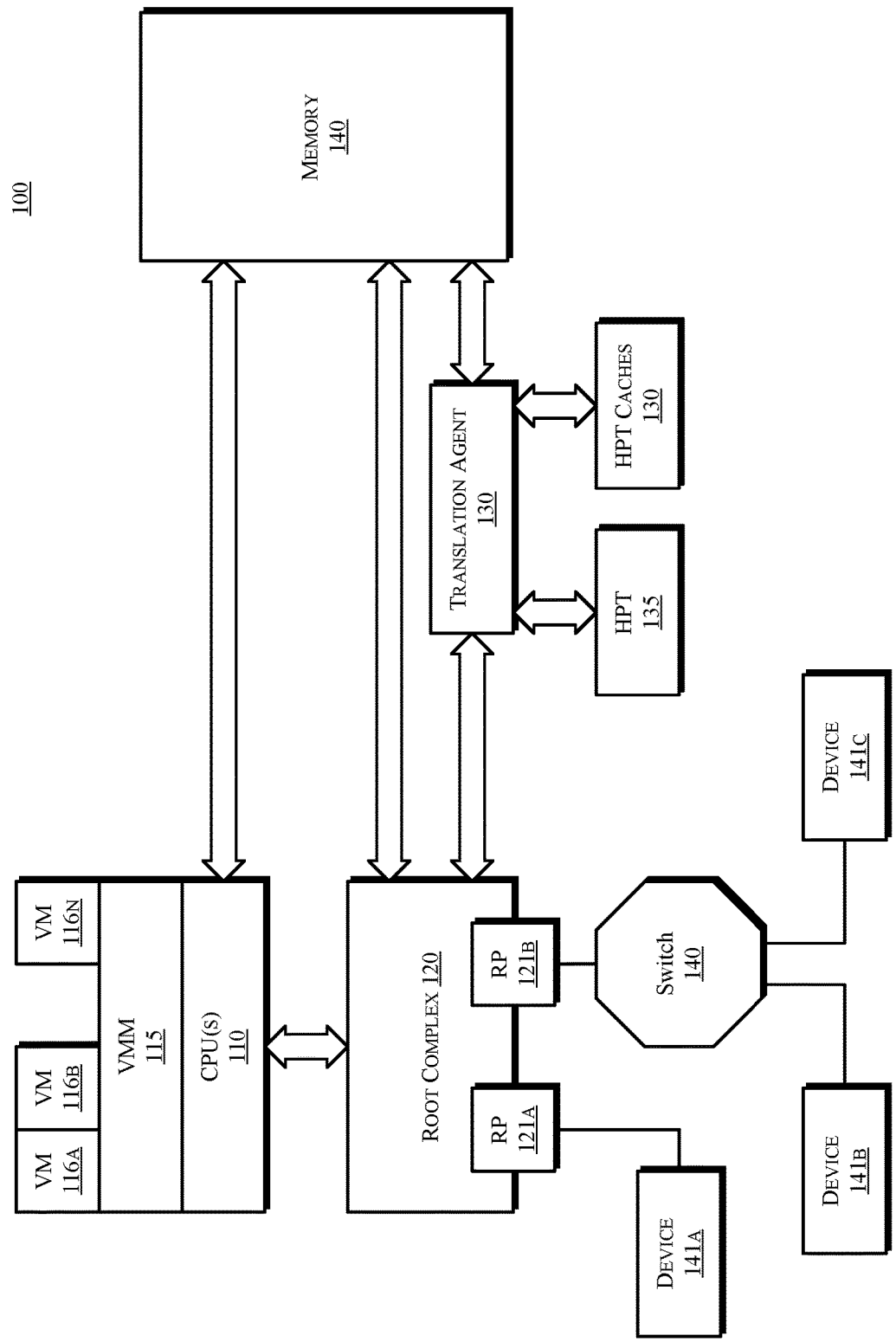
FIG. 1 is a block diagram illustrating a computing system architecture including a host system and associated integrated and/or discrete devices in accordance with an embodiment.

FIG. 1 is a block diagram illustrating a computing environment 100 comprising a host system and associated integrated and/or discrete devices 141a-c in accordance with an embodiment. In the context of the present example, the host system includes one or more central processing units (CPUs) 110, a root complex (RC) 120 and a memory 140. Similar to a host bridge in a PCI system, the RC 120 generates transaction requests on behalf of the CPUs 110, which are coupled to the RC 120 through a local bus and facilitates processing of requests by devices 141a-c, which are coupled to the RC 120 via respective host-to-device links 142a-c, and root port (RP) 121a or switch 140 and RP 121b. Depending on the particular implementation, RC functionality may be implemented as a discrete device, or may be integrated with a processor.

ATS uses a request-completion protocol between devices 141a-c and the RC 120 to provide translation services. Non-limiting examples of devices 141a-c include a network interface card (NIC), a graphics processing unit (GPU), a storage controller, an audio card, and a solid-state drive (SSD) in the form of a peripheral (auxiliary) device or an integrated device. The basic flow of an ATS request (e.g., a translation request or a translated request) begins with a context (e.g., a process or a function) of a device (e.g., one of devices 141a-c) determining through an implementation-specific method that caching a translation within the device's address translation cache (ATC) (not shown), for example, would be beneficial. The context (not shown) generates a translation request, which is sent upstream through the PCIe hierarchy (via host-to-device link 142b or 142c, switch 140, and RP 121b or via host-to device link 142a and RP 121a, depending upon the device 141a-c with which the context is associated) to the RC 120, which then forwards the request to translation agent 130. Non-limiting examples of host-to-device link 142a-c include a PCIe link or a cache-coherent link (e.g., CXL) that includes PCIe capabilities. When the translation agent 130 has completed processing associated with the ATS request, the translation agent 130 communicates the success or failure of the request to the RC 120, which generates an ATS completion and transmits it to the requesting device via the associated RP 121a or 121b.

As noted above, in accordance with the ATS Specification, translation agents perform various checks to among other things, validate the requesting device has been enabled by the system software to use ATS and that the HPA specified by a translated request is not part of a system protected range. In addition to these checks, which are insufficient to protect against a malicious ATS device, in various embodiments, the translation agent 130 may provide an access control mechanism that ensures a context of a device can only access HPAs to which it has explicitly been assigned appropriate permissions.

In some instances, system software (e.g., the operating system (not shown), virtual machine manager (VMM) 115 and/or virtual machines 116a-n) running on the host system can configure permissions (e.g., read and/or write access) for each page of memory 140 individually for each of devices 141a-c. These permissions (may be referred to herein as page access permissions, page permissions, HPT page access permissions and/or HPT page permissions) may be maintained on behalf of system software by the translation agent 130 in an HPT 135. The HPT 135 or portions thereof may be stored in a variety of locations including, but not limited to on-chip memory (e.g., static random access memory (SRAM)), off-chip memory (e.g., DRAM), registers or an external storage device (not shown).

Depending upon the particular implementation, the HPT 135 could be represented as a flat table in memory 140 in which for every device associated with the host system that is desired to use secure ATS and for each page in main memory a corresponding permission entry containing page access permissions specifying appropriate read/write permissions can be created. Alternatively, in order to avoid pre-allocating a large memory space and take advantage of the small size of the permission entries, the HPT 135 can be organized as a hierarchical table (similar to how address translation page tables are organized) as described further below. In any implementations in which the HPT 135 is stored off-chip, one or more optional, dedicated HPT caches 131 may be used to accelerate walking of the various levels of the HPT 135.

Overview

Embodiments described herein generally seek to provide an access control mechanism which ensures that a remote device communicatively coupled to a host device via a protocol such as PCIe can only access HPAs that were explicitly assigned to a context of the remote device initiating a memory operation at issue. As used herein the phrases a "context of" or "context on" a device generally refers to a bus to which the device is coupled, a process executing on the device, a function or virtual function being executed by the device or the device itself. This technique is based on creating a new Message Authentication Code (MAC) for every HPA that a remote device is allowed to access and only allowing device read/write memory accesses that present the correct MACs and haven't been revoked. An example input for MAC generation is shown in Table 1. In Table 1, square brackets "H" refer to bit offsets. Depending on the target page size, hardware will use the appropriate address bits.

TABLE 1

| Page Size | Input for MAC generation |
| --- | --- |
| 4 KB | Bus/Device/Function [15:0], counter, R, W, HPA [51:12] |
| 2 MB | Bus/Device/Function [15:0], counter, R, W, HPA [51:21] |
| 1 GB | Bus/Device/Function [15:0], counter, R, W, HPA [51:30] |

In examples described herein, access control is supported using cryptographic techniques, for example by authenticating physical addresses using a message authentication code (MAC). Further, replay attacks may be mitigated by tracking address invalidations in an invalidation tracking table (ITT), which may be stored in a memory of the host device. These techniques eliminate the need to maintain a permission table structure, such as the HPT 135 described with reference to FIG. 1.

In some embodiments, when a remote device initiates an access to a host device, the host device generates a MAC using a secret key and an HPA and returns the MAC and the HPA to the remote device. In subsequent memory access requests, the remote device presents both the HPA and the (MAC) to host device hardware. If the MAC presented by the remote device is equal to the MAC produced by the presented HPA and assigned key, then this is an indication that the HPA has at least once in the past assigned to a workload running at the remote device.

However, the HPA presented by the remote device may have been removed from the virtual machine (VM) workload running at the remote device and its corresponding virtual to physical mapping may have been invalidated. To distinguish between cases when the remote device can validly access the HPA and when it cannot, the host hardware maintains a data structure, referred to as an invalidation tracking table (ITT) that keeps track of per device HPA invalidations or invalidation ranges.

When the data structure that tracks invalidations becomes full the host hardware initiates a process by which the device flushes its TLBs and a new key is assigned to the device for generating per HPA MACs.

Broadly, described herein are access control mechanisms that ensure that remote devices (i.e. GPU, FPGA, etc.) that are using the ATS protocol can only access physical memory that is explicitly assigned to them by the host device. A Message Authentication Code (MAC) is assigned for each HPA the device is allowed to access and the HPA and the associated MAC are sent to the remote device. The remote device needs to present both the HPA and the correct MAC to the Host HW, in order to be allowed to access physical memory. In addition, we provide replay protection by tracking invalidated pages. Only if the MAC is correct and the presented HPA is not invalid can the device access the HPA.

Figure 2:
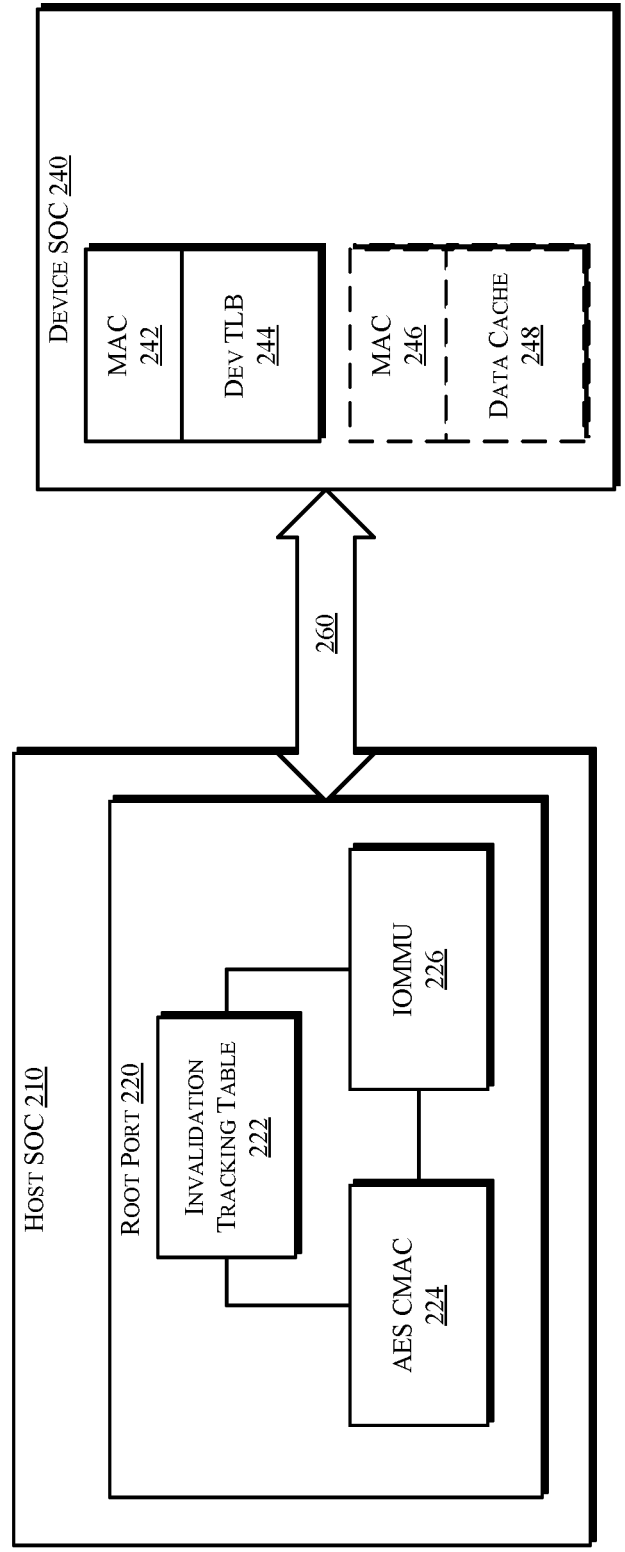
FIG. 2 is a block diagram illustrating components of a system to provide secure address translation services using message authentication codes and invalidation tracking in accordance with an embodiment.

FIG. 2 is a block diagram illustrating components of a system to provide secure address translation services using message authentication codes and invalidation tracking in accordance with an embodiment. Referring to FIG. 2, in some examples a system 200 may comprise a host system-on-a-chip (SOC) 210 communicatively coupled to a device SOC 240 via a host-to-device link 260. In some examples the host-to-device link 260 may comprise a PCIe communication link.

In some examples host SOC 210 comprises a root port 220, which may correspond to one or more of the root ports described with reference to FIG. 1. Root port 220 may comprise an IOMMU 226, an Advanced Encryption Standard (AES) Cipher-based Message Authentication Code (CMAC) module 224, and an invalidation tracking table 222. Device SOC 240 may comprise a MAC module 242, a device transaction lookaside buffer (Dev TLB) 244. Optionally, device SOC 242 may comprise one or more additional MAC modules 246 and a coherent data cache 248. It should be understood that AES CMAC is only one of the many standard MAC algorithms that can be employed for authenticating host physical addresses. Other standard MAC algorithms such as SHA256-HMAC or SHA3-KMAC could be employed for achieving the same goal.

Figure 3:
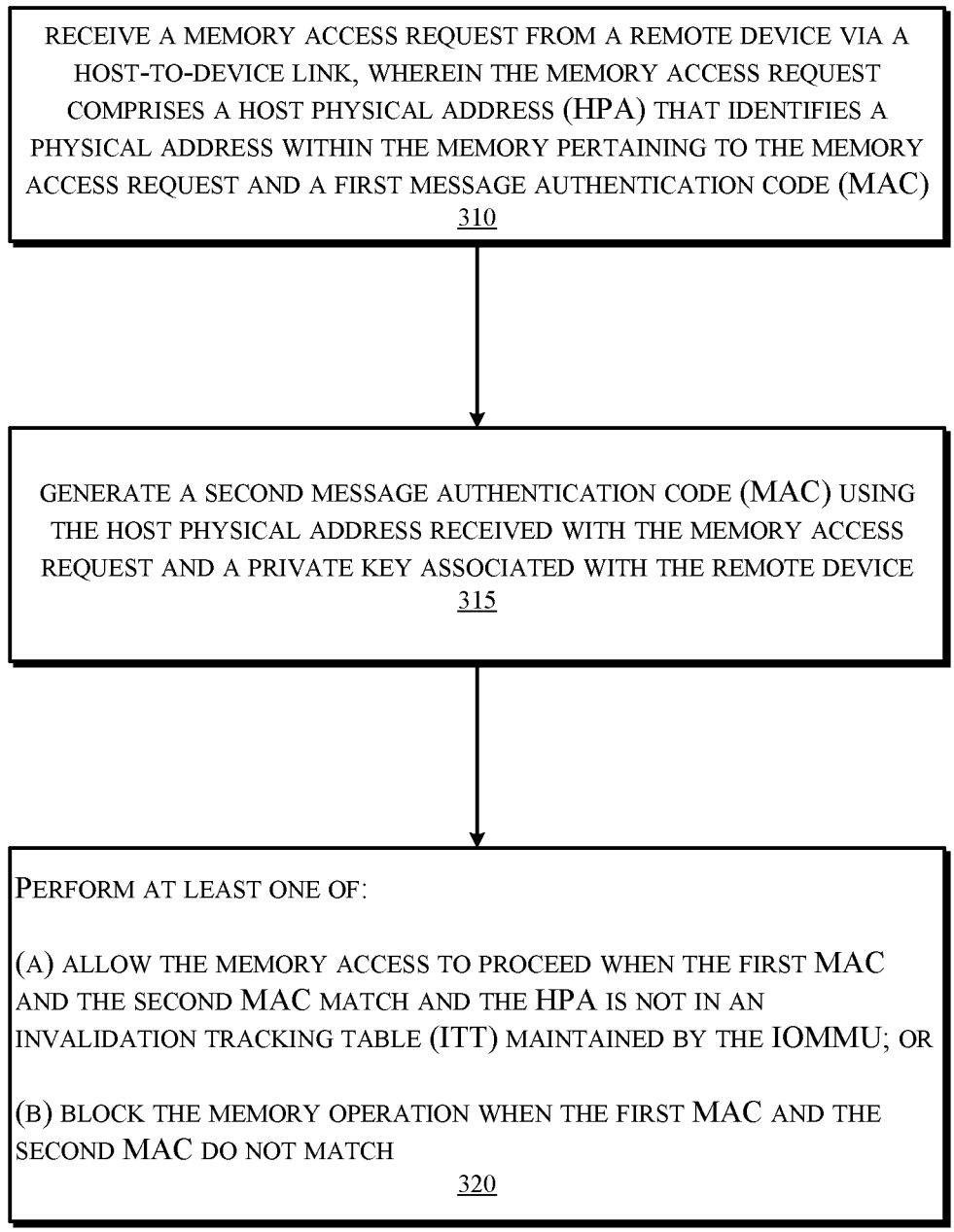
FIG. 3 is flowchart illustrating high-level operations in a method to provide secure address translation services using message authentication codes and invalidation tracking in accordance with an embodiment.

FIG. 3 is flowchart illustrating high-level operations in a method to provide secure address translation services using message authentication codes and invalidation tracking in accordance with an embodiment. In some examples the operations depicted in FIG. 3 may be implemented by a processing device of the host SOC 210, such as the IOMMU 226.

Referring to FIG. 3, at operation 310 the IOMMU receives a memory access request from a remote device via a host-to-device link, wherein the memory access request comprises a host physical address (HPA) that identifies a physical address within the memory pertaining to the memory access request and a first message authentication code (MAC). At operation 315, the IOMMU generates a second message authentication code (MAC) using the host physical address received with the memory access request and a private key associated with the remote device. At operation 320 the IOMMU performs at least one of allowing the memory access to proceed when the first MAC and the second MAC match and the HPA is not in an invalidation tracking table (ITT) maintained by the IOMMU, or blocking the memory operation when the first MAC and the second MAC do not match.

Figure 4:
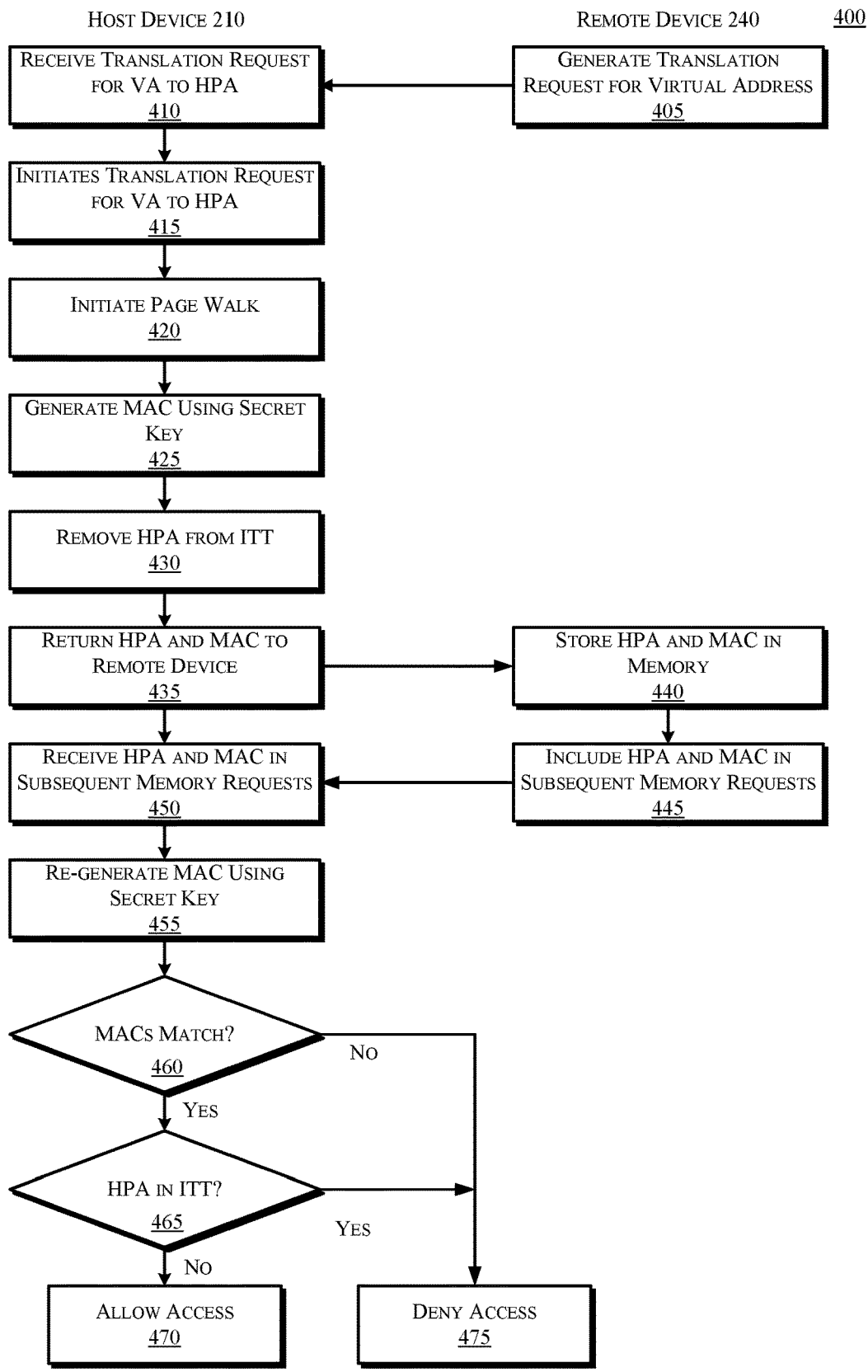
FIG. 4 is flowchart illustrating operations in a method to provide secure address translation services using message authentication codes and invalidation tracking in accordance with an embodiment.

FIG. 4 is flowchart illustrating in greater detail operations in a method 400 to provide secure address translation services using message authentication codes and invalidation tracking in accordance with an embodiment. Referring to FIG. 4, at operation 405 a remote device 240 generates an ATS translation request for a virtual address (e.g., an I/O Virtual Address (IOVA), a Guest Virtual Address (GVA), or a Guest Physical Address (GPA)) maintained by the remote device 240 to an HPA. At operation 410 the translation request is received by the host device 210. In some examples the translation request may be received by the IOMMU 226.

At operation 415 the IOMMU 226 initiates the translation request received from the remote device 240. At operation 420 the IOMMU 226 initiates a page walk through the invalidation tracking table 222, and at operation 425 the IOMMU 226 generates a MAC using a secret key assigned to the remote device 240. At operation 430 the IOMMU removes the HPA generated at 415 from the invalidation tracking table 222, if the HPA is located in the invalidation tracking table 222.

At operation 435 the IOMMA returns the HPA and the MAC to the remote device, e.g., via a Transaction Completion operation on the host-to-device link 260. At operation 440 the remote device 240 stores the HPA and associated virtual address in association with the MAC received from the host device 210. In some examples this data may be stored in the transaction look-aside buffer 244.

Subsequently, when the remote device 240 initiates, at operation 445, a request to read from and/or write to a physical address, the remote device 240 will include the corresponding MAC with the request sent to the host device 210, e.g., via a Translated Request. At operation 450 the host device 210 receives the HPA and MAC from the remote device 240 in a subsequent memory request. At operation 455 the IOMMU 226 will re-generate the MAC and at operation 450 compare it with the one that was sent by the device. If, at operation 460, the MACs do not match, then control passes to operation 475 and the device access will be denied. By contrast, if at operation 460 the MACs match, then control passes to operation 465 and the IOMMU 226 will look up the HPA in the invalidation tracking table 222. If, at operation 465 the HPA is not in the invalidation tracking table 222, then control passes to operation the access will be allowed. By contrast, if at operation 465 the HP is in in invalidation tracking table 222, then control passes to operation 475 and the device access will be denied.

In some aspects, the techniques described herein provide replay protection. For example, if the IOMMU 226 had once allowed a remote device 240 to access an HPA, but the access has subsequently been revoked (i.e., HPA has been removed from a VM and assigned to a different VM to use), then the remote device 240 should not be able to access that HPA anymore.

In some examples, every time a page of memory is invalidated, the IOMMU 226 may generate new MACs, either by generating a new key or by increasing the counter, and instruct the remote device 240 to do a full flush of its transaction look-aside buffer Dev-TLB 244. This procedure ensures that old MACs are discarded and any new Translation Requests will receive a new MAC. However, this reduces the performance benefits of the Dev-TLB, since invalidations may be frequent.

In some examples, host invalidations may be stored in the invalidation tracking table (ITT) 222, and the IOMMU 226 may check that every valid MAC has not been previously revoked. This document describes four different formats for implementing the ITT; (i) a simple table; (ii) a Content Addressable-Memory (CAM) structure (iii) a modified Ternary CAM (TCAM) structure and (iv) a tree.

Various components and operations will be described in greater detail below with reference to the accompanying figures.

CAM Invalidation Tracking Table

Figure 5A:
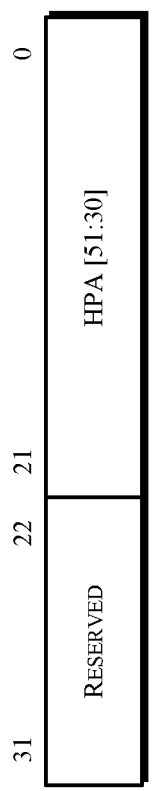
FIGS. 5A, 5B, and 5C illustrate examples of table entries in an invalidation tracking table in accordance with an embodiment.
Figure 5B:
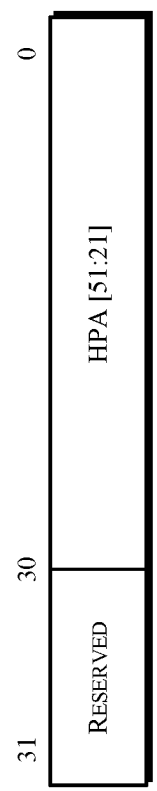
Figure 5C:
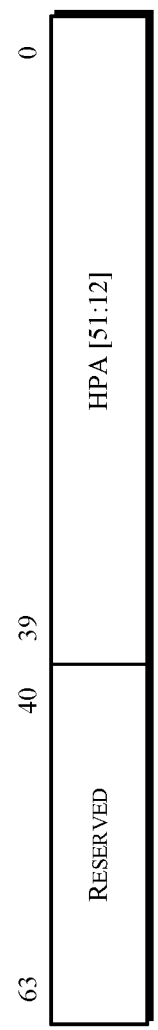

In one embodiment, the ITT 222 can be implemented as either a direct mapped cache or a set associative cache split into three levels, i.e., one level for each of the three different page sizes (i.e. 4 KB, 2 MB and 1 GB page) depicted in Table 1. FIGS. 5A, 5B, and 5C illustrate examples of table entries 500 in an invalidation tracking table in accordance with an embodiment. FIG. 1 shows an example ITT entry format for a 1 GB table. FIG. 2 shows an example ITT entry for a 2 MB table. FIG. 5C shows an example table entry for a 4 kb table. The caches are per device. In some examples a hash function may be used to select the cache set, to which a given HPA is mapped.

In some examples ITT table entries such as those depicted in FIGS. 5A, 5B, and 5C need only store the HPAs that the host software has recently invalidated, without the need to store who had access to those pages and their permissions. Host software may execute procedures to optimize, or at least to improve, this and send only HPA invalidations that had been given to the device to access.

One advantage of this approach is that hardware can postpone a costly DevTLB flush, while being able to process ATS requests without extra memory accesses. Examples of ITT sizes for each level and their maximum memory coverage is shown in Table 2.

TABLE 2

Example ITT Sizes and Memory Coverage

| Invalidation Tracking Table Level | Example ITT Size | # of Entries | Maximum Memory Coverage |
| --- | --- | --- | --- |
| 1 GB page | 256 B | 64 | 64 GB |
| 2 MB page | 8 KB | 2,048 | 4 GB |
| 4 KB page | 16 KB | 2,048 | 8 MB |

In some examples, if host software performs an invalidation, then hardware will attempt to insert a new HPA in the ITT. However, if there is no free space in the corresponding ITT cache set, then hardware declares the ITT full, performs a DevTLB flush and clears the ITT. Details of these operations are described in detail in the following sections.

ATS Translation Request Processing

Figure 6:
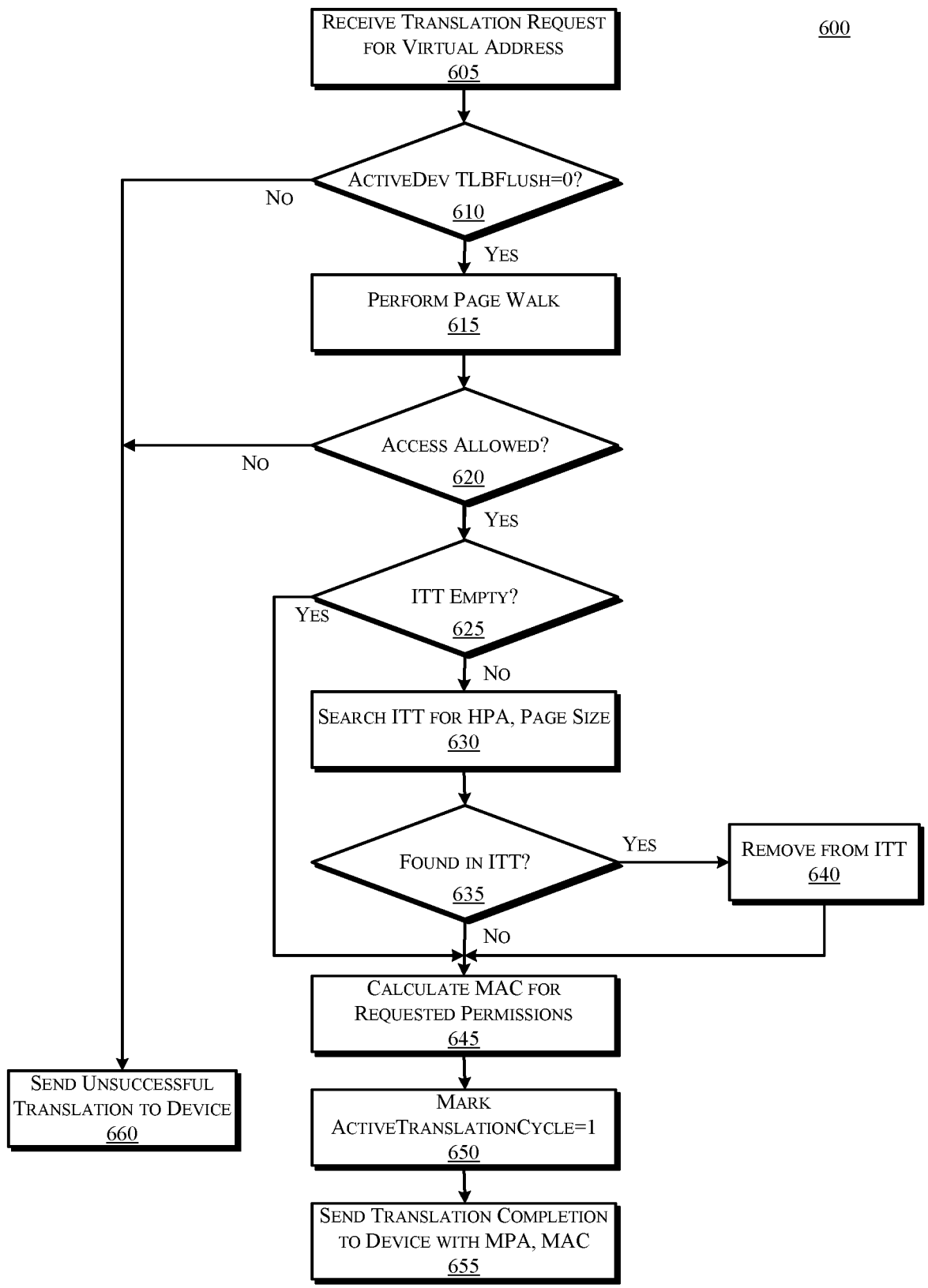
FIG. 6 is flowchart illustrating high-level operations in a method to provide secure address translation services using message authentication codes and invalidation tracking in accordance with an embodiment.

FIG. 6 is flowchart illustrating high-level operations in a method 600 to provide secure address translation services using message authentication codes and invalidation tracking in accordance with an embodiment. Referring to FIG. 6, in some examples, when a device sends a translation request for a given virtual address (i.e. GVA, GPA or IOVA), the translation request is received in the host (operation 605) and at operation 610 hardware in the host (e.g., the IOMMU 226) will initially ensure that there is no global DevTLB underway. If, at operation 610, there is an active global DevTLB flush, then control passes to operation 660 and the IOMMU 226 responds to the requesting device with an unsuccessful translation completion error. By contrast, if at operation 610 there is not an active global DevTLB flush, control passes to operation 615 and the IOMMU 226 performs a virtualized technology for directed I/O (VT-d) page walk.

If, at operation 620, the translation does not result in a physical page to which the requesting device is allowed access then control passes to operation 660 and the IOMMU 226 responds to the requesting device with an unsuccessful translation completion error. By contrast, if at operation 620 the page walk results in a physical page (i.e. HPA) to which the device is allowed access according to the first and second level page permissions, then control passes to operation 625, where it is determined whether the ITT 222 is empty.

If, at operation 625 the ITT 222 is empty, then control passes directly to operation 645. By contrast, if at operation 625 the ITT 222 is not empty, then control passes to operation 630 and the ITT is searched for an HPA using that physical address and the page size. If, at operation 635, a page is found in the ITT 222 then control passes to operation 640 and the page is removed from the ITT 222. By contrast, if at operation 635 no page is found in the ITT 222, then control passes directly to operation 645.

At operation 645 the IOMMU 222 calculates the MAC for the requested permissions. At operation 650 the IOMMU marks that at least one successful Translation has been completed using a current MAC Cycle counter (i.e. Active-TranslationCycle flag). This flag may be checked on invalidation messages, as described below, and will dictate whether we need to add a new HPA in the ITT 222. At operation 655 the IOMMU and sends a Translation Completion to the requesting device with the MPA and MAC.

ATS Translated Request Processing

According to one embodiment, ATS translated requests with a given HPA may be checked to verify that the device has permission to perform the specified read/write operation. When a remote device sends a translated request for a given physical address, the remote device also need to send the associated MAC. Based on whether the translated request was for a read or a write, host hardware (e.g., the IOMMU 226) will need to calculate every possible combination of MACs for every possible page size and every possible permissions. Specifically, for a translated read request, hardware will need to compute the MACs for read-only permissions and read-write permissions to a 4 KB, 2 MB or 1 GB page (i.e., 6 MACs in total). This happens because at the time of the translated request, hardware doesn't know what where the exact permissions that were granted and the exact page size that the HPA requires.

If none of the generated MACs matches that MAC that the requesting device sent, then the access is aborted and an interrupt would be sent to host software to inform it about the attempted malicious access. If any of the generated MACs matches the received MAC, then hardware may look up the ITT to verify that the HPA hasn't been invalidated. The access will be allowed if the HPA doesn't exist in the ITT.

Figure 7:
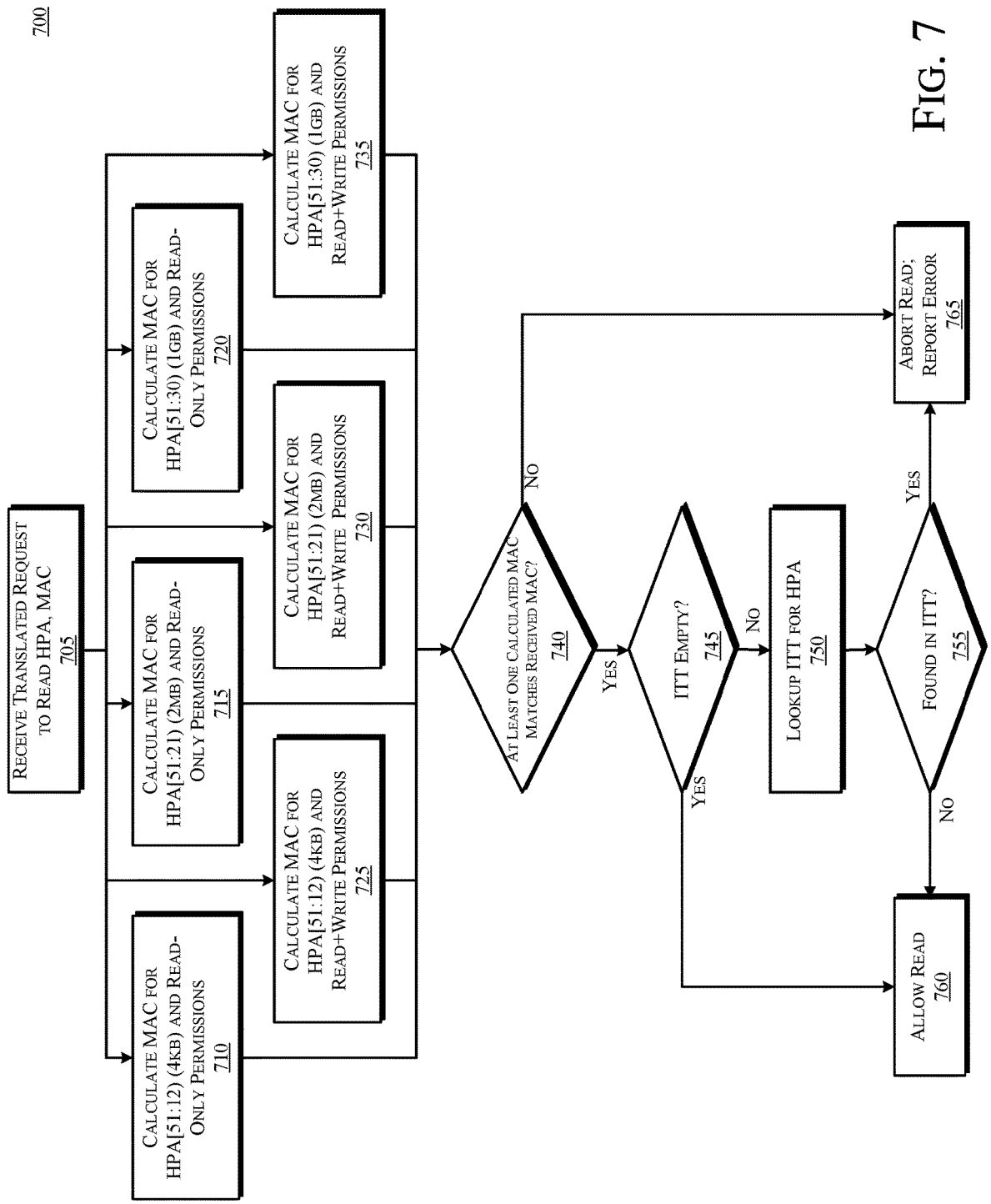
FIG. 7 is flowchart illustrating operations in a method to provide secure address translation services using message authentication codes and invalidation tracking in accordance with an embodiment.

FIG. 7 is flowchart illustrating operations in a method 700 to provide secure address translation services using message authentication codes and invalidation tracking in accordance with an embodiment. Referring to FIG. 7, at operation 705 the host device receives a translated request to read a HPA and a MAC. Operations 710-735 calculate the MAC for different formats of the HPA, as described above. Operation 710 calculates the MAC for HPA (51:12) (4 KB) and read-only permissions. Operation 715 calculates the MAC for HPA (51:21) (2 MB) and read-only permissions. Operation 720 calculates the MAC for HPA (51:30) (1 GB) and read-only permissions. Operation 725 calculates the MAC for HPA (51:12) (4 KB) and read-write permissions. Operation 730 calculates the MAC for HPA (51:21) (2 MB) and read-write permissions. Operation 735 calculates the MAC for HPA (51:30) (1 GB) and read-write permission.

At operation 740 it is determined whether the MAC received with the translated request matches any of the MACs calculated in operations 710-735. If, at operation 740 there are no matching MACs then control passes to operation 765 and the read operation is aborted and an error is generated. By contrast, if at operation 740 there is a matching MAC calculated in operations 710-735, then control passes to operation 745, where it is determined whether the ITT 222 is empty.

If, at operation 745 the ITT 222 is empty, then control passes to operation 760 and the read operation is allowed. By contrast if at operation 745 the ITT 222 is not empty then control passes to operation 750 and the IOMMU performs a lookup operation on the ITT 222 for the HPA. If, at operation 755, the HPA is not found in the ITT 222 then control passes to operation 760 and the read operation is allowed. By contrast if at operation 755, the HPA is found in the ITT 222 then control passes to operation 765 and the read operation is aborted and an error is generated.

Invalidation

According to one embodiment, if host software wants to invalidate a physical page, then host software will need to send a new invalidation message to hardware using the existing invalidation infrastructure, indicating the HPA of that page and its page size. This invalidation message may need to immediately follow a DevTLB Invalidation message, where software will instruct the device to discard virtual to physical page address translations.

After hardware has received the HPA invalidation request from software, hardware will wait until there is no global DevTLB underway. If there has been no Translation Request, and hence no MAC generation, since we last updated the MAC cycle counter, then the invalidated HPA is not added to the ITT 222. This will ensure that if host software sends a batch of Invalidation messages that trigger a global DevTLB flush, hardware will not keep causing global DevTLB flushes, unless the device requests for new translations.

If a translation request has occurred and a MAC has been generated using the current MAC cycle counter, then hardware will attempt to add the new HPA in the ITT 222. If ITT 222 has no space for the new HPA, then hardware will follow the global DevTLB invalidation flow.

Figure 8:
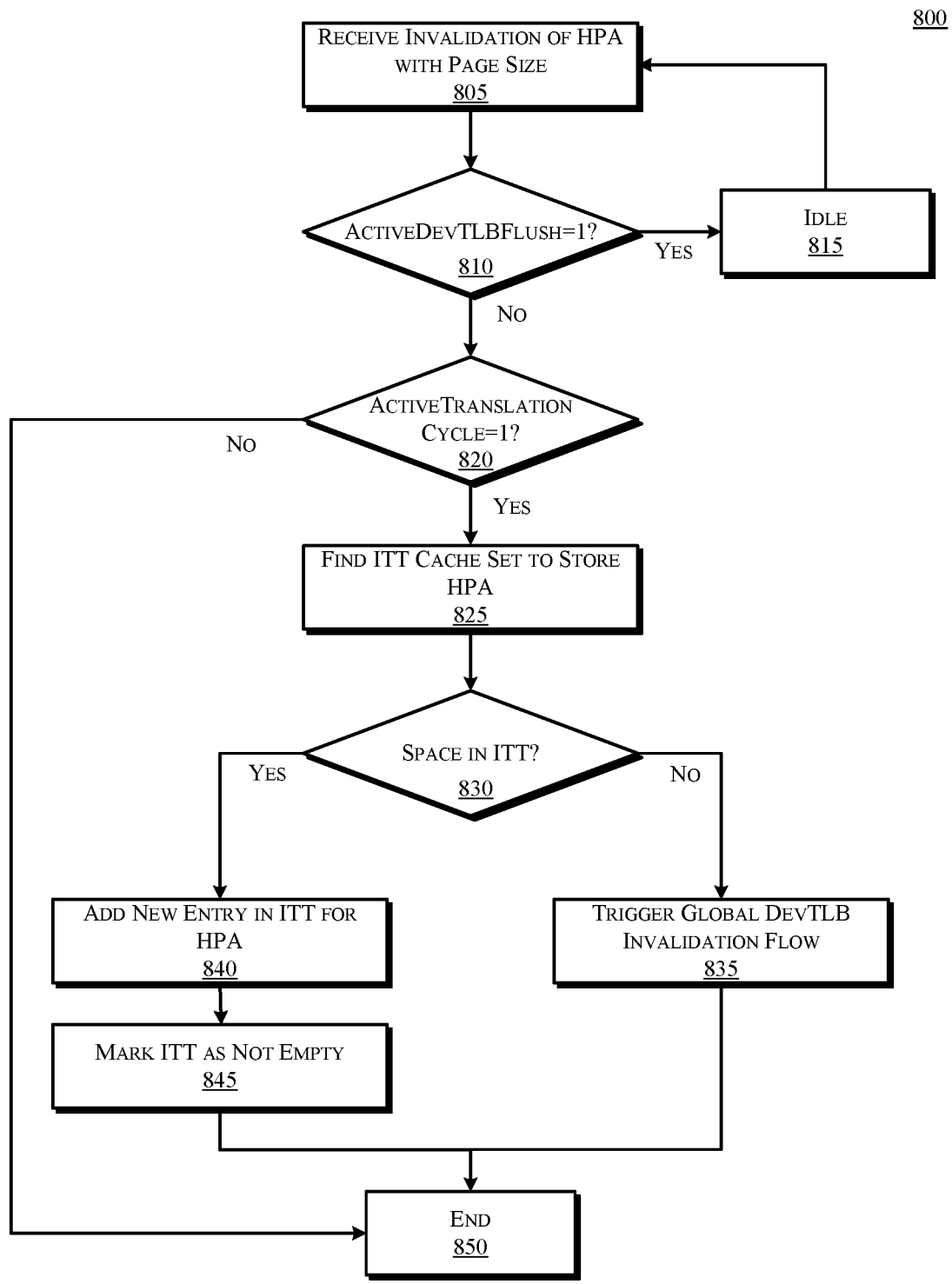
FIG. 8 is flowchart illustrating operations in a method to provide secure address translation services using message authentication codes and invalidation tracking in accordance with an embodiment.

FIG. 8 is flowchart illustrating operations in a method 800 to provide secure address translation services using message authentication codes and invalidation tracking in accordance with an embodiment. Referring to FIG. 8, at operation 805, an invalidation request is received in host hardware, e.g., the IOMMA 226. If, at operation 810, the flag ActiveDevTLBFlush is set to 1, which indicates that a global TLB flush is taking place, then control passes to operation 815 and the IOMMU 226 remains idle and control passes back to operation 805 to wait for another invalidation request. By contrast, if at operation 810, the flag ActiveDevTLBFlush is not set to 1, which indicates that a global TLB flush is not taking place, then control passes to operation 820.

If, at operation 820, the flag ActiveTranslationCycle is not set to 1, which indicates that there has been no translation request, and hence no MAC generation, then control passes to operation 815 and the IOMMU 226 remains idle and control passes to operation 850 and the process ends without adding invalidated HPA to the ITT 222. By contrast, if at operation 820, the flag ActiveTranslationCycle is set to 1, which indicates that a translation request has been received, then control passes to operation 825 and the IOMMU 226 will attempt to add the HPA received in the invalidation request to the ITT 222.

If, at operation 830, there is no space in the ITT 222, then control passes to operation 835 and a global DevTLB invalidation flow is triggered. This flow is described below and with reference to FIG. 9. By contrast, if at operation 830 there is space in the ITT 222 then control passes to operation 840 and the IOMMU 226 adds a new entry in the ITT 222 for the HPA received with the invalidation request. At operation 845 the IOMMU 226 marks the ITT 222 as not empty, and control then passes to operation 850 and the process ends.

In case of a global DevTLB Invalidation request, triggered either explicitly by software or implicitly because ITT 222 became full, hardware will send a global DevTLB message to the device and increase the newMACCycleCounter. Any Translated Requests, which are received after hardware has sent the global DevTLB invalidation to the device, will use the oldMACCycleCounter to compute and validate their MACs. Also, the request needs to go through ITT 222 as normal. On the other hand, any translation requests, which are received after hardware has sent the global DevTLB Invalidation to the device will return to the device an unsuccessful translation completion error.

Once the device has sent a DevTLB invalidation completion message, hardware will need to clear the ITT 222, update the oldMACCycleCounter with the value of the newMACCycleCounter, set activeTranslationCycle to 0 (no Translation has used the new counter yet) and finally, set activeDevTLBflush to 0 to allow hardware to process new invalidations and new translations.

Figure 9:
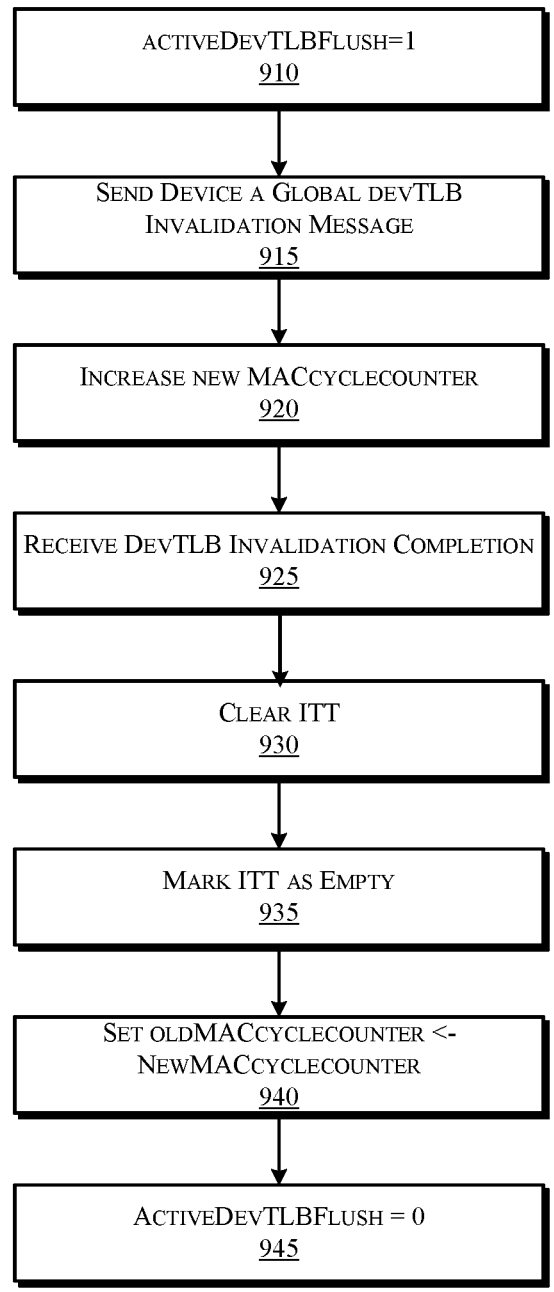
FIG. 9 is flowchart illustrating operations in a method to provide secure address translation services using message authentication codes and invalidation tracking in accordance with an embodiment.

FIG. 9 is flowchart illustrating operations in a method 900 to provide secure address translation services using message authentication codes and invalidation tracking in accordance with an embodiment. Referring to FIG. 9, at operation 910 the flag ActiveDevTLBFlush is set to 1. At operation 915 a global DevTLB invalidation messages is sent to the remote device. At operation 920 the NewMACCycleCounter is incremented, and at operation 930 the ITT 222 is cleared. At operation 935 the ITT is marked as being empty. At operation 940 the flag OldMACCycleCounter is set to reflect the value of the flag NewMACCycleCounter. At operation 945 the flag ActiveDevTLBFlush is set to 0 such that host hardware (e.g., IOMMU 226) can process new invalidations and new translations.

Special Cases

Some examples of this implementation have a limitation in handling page splits (i.e. splitting a 1 GB page into multiple, consecutive 4 KB pages) and page merges (i.e. merging multiple consecutive 4 KB pages into a 1 GB page). To account for that, Host software may trigger a global DevTLB flush every time it will need to perform either operation. However, we estimate that those are infrequent events, so they would not impact the overall performance of this approach.

Invalidating Address Ranges

Figure 10:
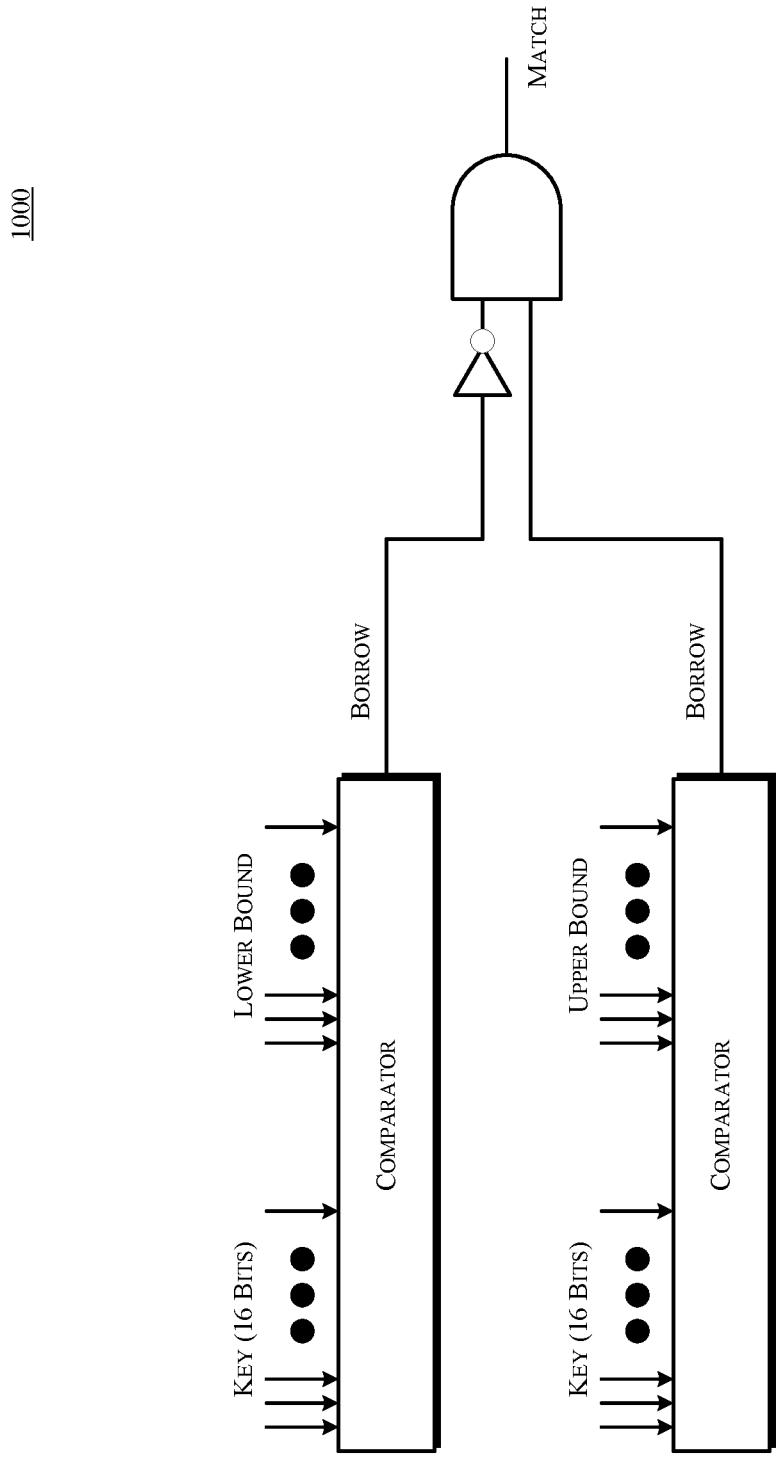
FIG. 10 is a block diagram illustrating a modified ternary CAM entry supporting address range invalidation in accordance with an embodiment.

According to one embodiment, ranges of physical addresses may be invalidated. Referring to FIG. 10, one or more ternary CAMs 1000 or modified ternary CAMs may be used in this case for tracking the invalidation of ranges. A Ternary CAM entry stores a range, expressed as a binary prefix. For each entry a TCAM checks whether the bits of an input value, which are defined as 'relevant' according to the prefix mask stored in the TCAM entry, are equal to the bits of the value stored in the entry. A Ternary CAM can be modified to support range matching using arbitrary bounds, where the input to an entry may be compared to an upper and lower bound as shown in FIG. 10.

Figure 11:
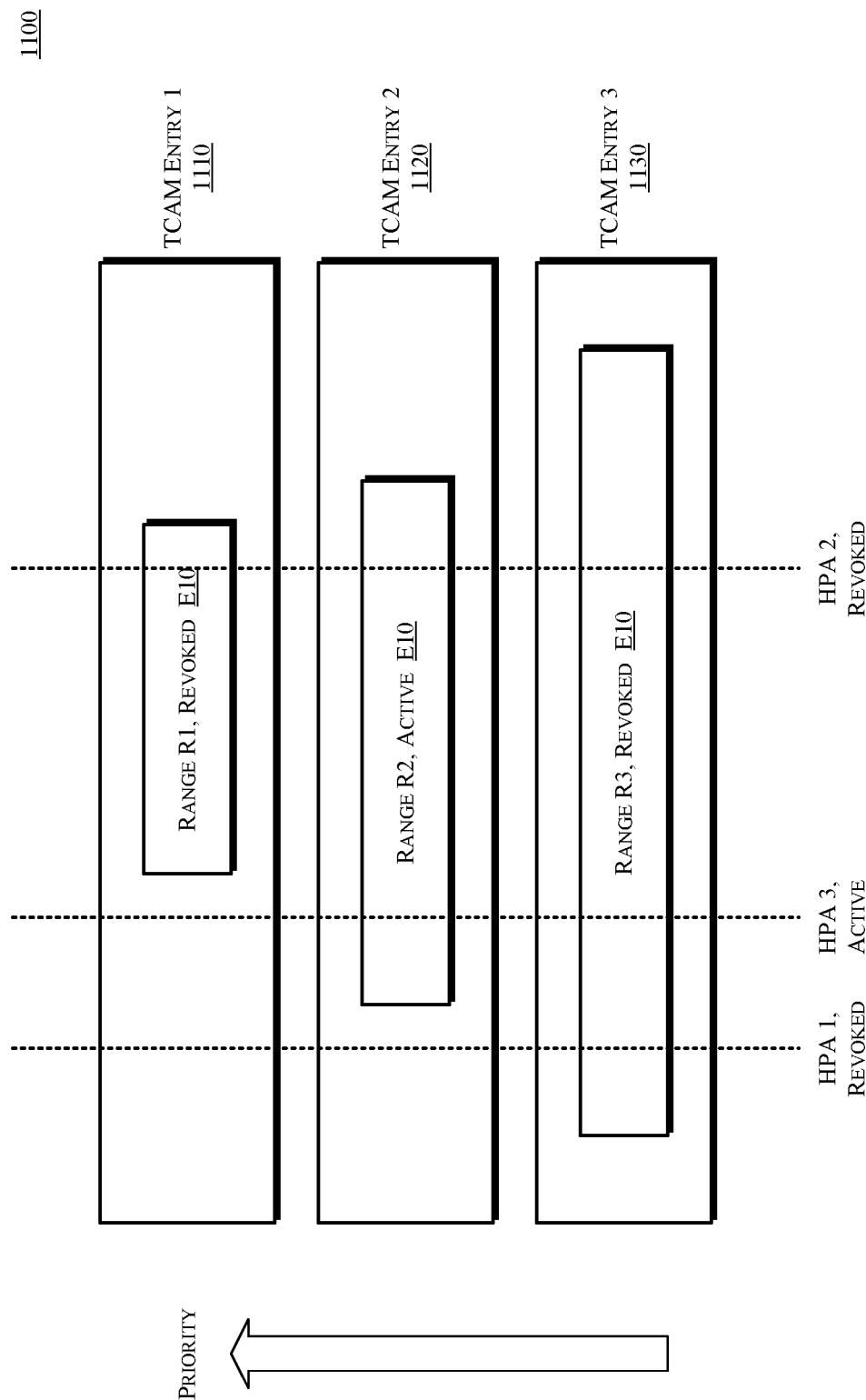
FIG. 11 is block diagram illustrating active and invalidated ranges of host physical addresses stored in a ternary CAM and ordered according to a priority list in accordance with an embodiment.

FIG. 11 illustrates three different ranges stored in a TCAM and ordered in a priority list. Range R3 in TCAM entry 1 1110 is the widest of all and contains both R2 and R1. Range R2 in TCAM entry 2 1120 is narrower, is contained in R3 in TCAM entry 3 1130, but contains R1. Range R1 is the narrowest and is contained in both R2 and R3. R3 and R1 are ranges of invalid HPAs and R2 is a range of active HPAs. As used herein, the term 'active' we mean HPAs that have not been revoked. The efficiency from using the TCAM comes from the fact that each range, which may be arbitrarily large, needs only a single entry to be represented. Furthermore, priority resolution hardware helps with determining whether specific HPAs are revoked or not, based on their inclusion into the ranges stored in the TCAM and the status (i.e., active or revoked) of the highest matching entry. In the example of FIG. 11, three HPAs are shown. The highest priority range that covers HPA 1 is range R3, which is revoked. Hence HPA1 is also revoked. Similarly, the highest priority range that covers HPA2 is range R1, which is revoked. Hence HPA2 is revoked too. On the other hand, the highest priority range that covers HPA3 is range R2, which is active. Hence HPA3 is active.

Figure 12:
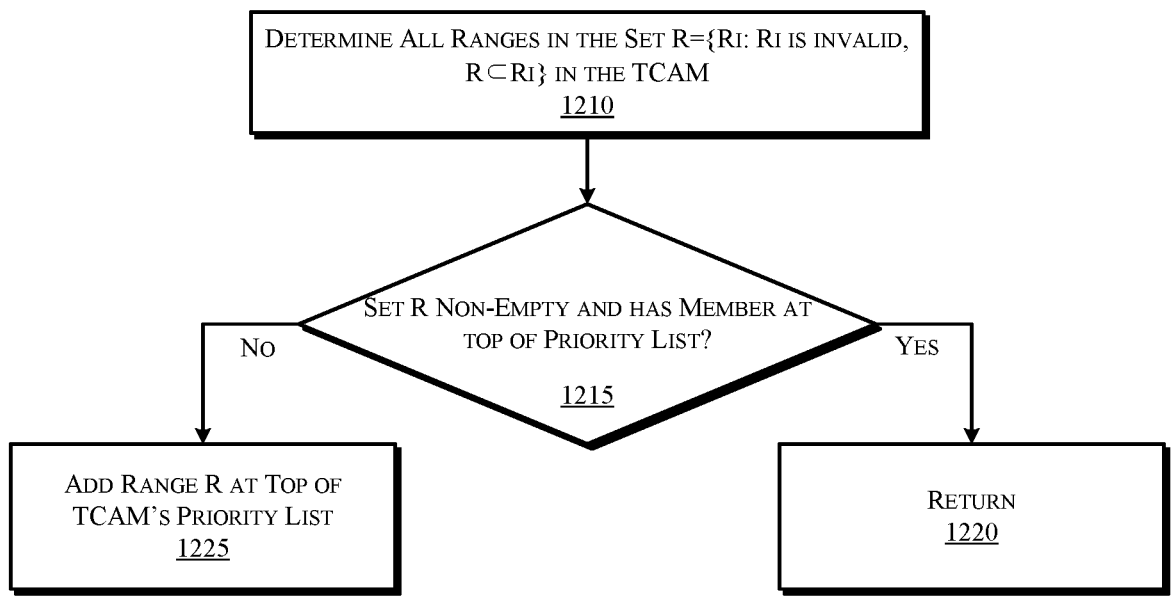
FIG. 12 is a flowchart illustrating operations in a method to insert an invalid range into a ternary CAM in accordance with an embodiment.

FIG. 12 is a flowchart illustrating operations in a method 1200 to insert an invalid range into a ternary CAM in accordance with an embodiment. Referring to FIG. 12, the flow chart of the figure illustrates the process of inserting a range R of revoked HPAs into a TCAM such as the TCAM 1000. At operation 1210 the TCAM hardware logic determines a set of all ranges of revoked HPAs which are represented as TCAM entries, contain R, and which are stored in the TCAM. If, at operation 1215, the set is not empty and has a member at the top of the priority list, then control passes to operation 1220, no insertion is made and the process returns. Thus, at the top of the list, there is already a range which includes R. Thus, for any HPA in the range R will be determined to be revoked by the TCAM, so the insertion of R is redundant. By contrast, if at operation 1215 the set does not exist, or if it does not include any member at the top of the list, then control passes to operation 1225 and the range R is added at the top of the TCAM's priority list.

Figure 13:
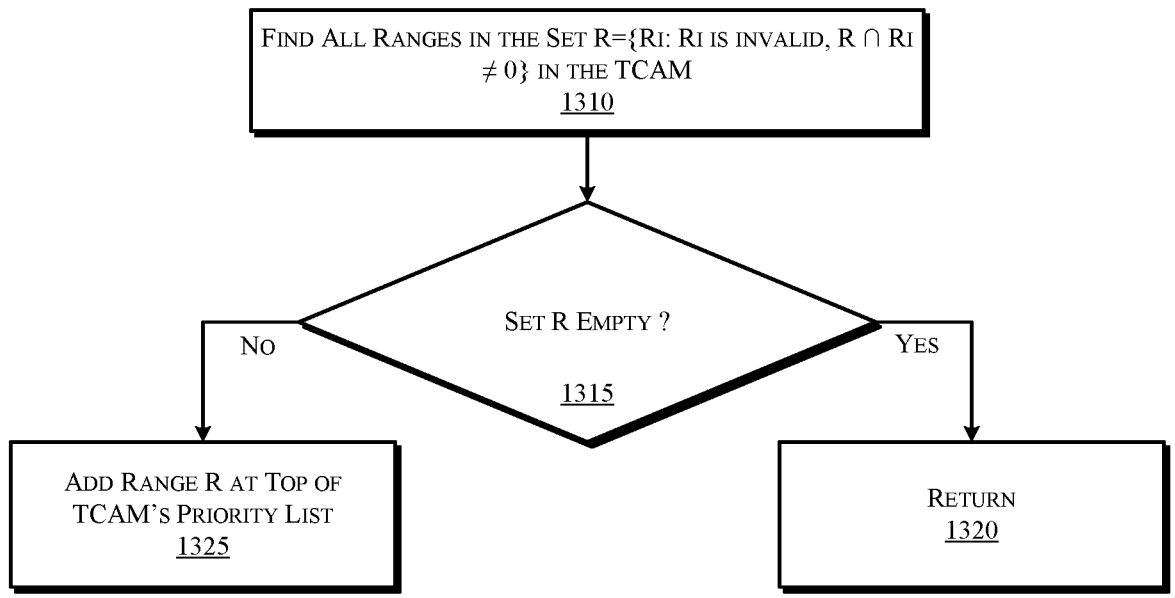
FIG. 13 is a is a flowchart illustrating operations in a method to insert an active range into a ternary CAM in accordance with an embodiment.

FIG. 13 is a flowchart illustrating operations in a method 1300 to insert an active range into a ternary CAM in accordance with an embodiment. More particularly, FIG. 13, illustrates operations in the process of inserting a range R of HPAs that correspond to valid mappings into a TCAM, such as the TCAM 1000. Referring to FIG. 13, at operation 1310 the TCAM hardware logic determines the set of all ranges of revoked HPAs which are represented as TCAM entries, intersect with R, and are stored in the TCAM 1000. If, at operation 1315, this set is empty, then control passes to operation 1320, no insertion is made and the process returns. This is because the TCAM is primarily an invalidation tracking data structure, so if no entry is found in the TCAM matching an HPA it means that the HPA has not been revoked. By contrast, if at operation 1315 such a set R exists, then control passes to operation 1325 and the range R is added at the top of the TCAM's priority list.

It should be understood that the subject matter described herein covers embodiments that track the invalidation of both regular HPAs and HPA ranges contemporaneously. In such embodiments the host hardware maintains both regular tables of hash tables and TCAMs tracking range invalidations Tree-Based Invalidation Tracking Table Optionally, in one embodiment, invalidation tracking can similarly be supported by a tree that can be walked just as page tables are walked.

MAC Size and Key Generation

In some examples a 32-bit MAC and six generated MACs for each translate request yields $6*1/(2^{32})$, resulting in one MAC collision in every 670 million tries. If the time for software to observe the IOMMU interrupt resulting from a mismatched MAC is approximately 2 milliseconds and the time for a VMM to take action (i.e., a function reset or a disable ATS operation) is approximately 1 millisecond, then for a 1 GHz PCIe bus the malicious device can send up to $2^{21}$ malicious translated requests, and for a 2 GHz CXL bus the malicious device can send up to $2^{22}$ malicious translated requests. Thus, the MAC needs to be at least 22 bits. In some examples a malicious device can mask errors behind other "less severe" errors, since IOMMU has limited resources to log faults. It can also split the X million tries into chunks, until it finds the one.

In some examples there can be a key per IOMMU, assigned on boot by VMM via VT-d BAR. Periodically, the IOMMU can send an interrupt to IOMMU to update it. This will cause a global devTLB invalidation.

Exemplary Computing Architecture

Figure 14:
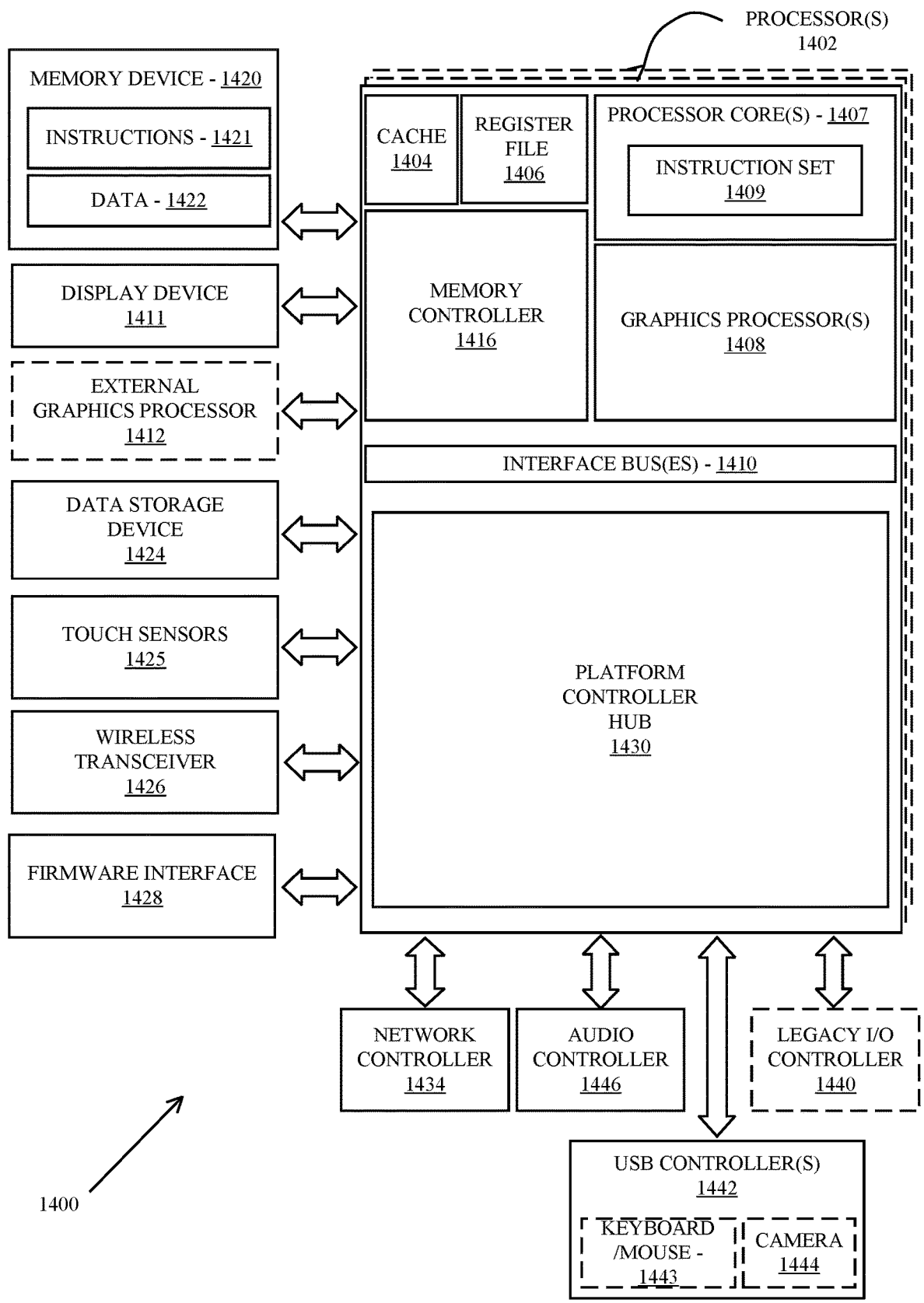
FIG. 14 is a block diagram illustrating a computing architecture which may be adapted to provide secure address translation services using message authentication codes and invalidation tracking in accordance with an embodiment.

FIG. 14 is a block diagram illustrating a computing architecture which may be adapted to implement a secure address translation service using a permission table (e.g., HPT 135 or HPT 260) and based on a context of a requesting device in accordance with some examples. The embodiments may include a computing architecture supporting one or more of (i) verification of access permissions for a translated request prior to allowing a memory operation to proceed; (ii) prefetching of page permission entries of an HPT responsive to a translation request; and (iii) facilitating dynamic building of the HPT page permissions by system software as described above.

In various embodiments, the computing architecture 1400 may comprise or be implemented as part of an electronic device. In some embodiments, the computing architecture 1400 may be representative, for example, of a computer system that implements one or more components of the operating environments described above. In some embodiments, computing architecture 1400 may be representative of one or more portions or components in support of a secure address translation service that implements one or more techniques described herein.

As used in this application, the terms "system" and "component" and "module" are intended to refer to a computer-related entity, either hardware, a combination of hardware and software, software, or software in execution, examples of which are provided by the exemplary computing architecture 1400. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1400.

As shown in FIG. 14, the computing architecture 1400 includes one or more processors 1402 and one or more graphics processors 1408, and may be a single processor desktop system, a multiprocessor workstation system, or a server system having a large number of processors 1402 or processor cores 1407. In on embodiment, the system 1400 is a processing platform incorporated within a system-on-a-chip (SoC or SOC) integrated circuit for use in mobile, handheld, or embedded devices.

An embodiment of system 1400 can include, or be incorporated within, a server-based gaming platform, a game console, including a game and media console, a mobile gaming console, a handheld game console, or an online game console. In some embodiments system 1400 is a mobile phone, smart phone, tablet computing device or mobile Internet device. Data processing system 1400 can also include, couple with, or be integrated within a wearable device, such as a smart watch wearable device, smart eyewear device, augmented reality device, or virtual reality device. In some embodiments, data processing system 1400 is a television or set top box device having one or more processors 1402 and a graphical interface generated by one or more graphics processors 1408.

In some embodiments, the one or more processors 1402 each include one or more processor cores 1407 to process instructions which, when executed, perform operations for system and user software. In some embodiments, each of the one or more processor cores 1407 is configured to process a specific instruction set 14014. In some embodiments, instruction set 1409 may facilitate Complex Instruction Set Computing (CISC), Reduced Instruction Set Computing (RISC), or computing via a Very Long Instruction Word (VLIW). Multiple processor cores 1407 may each process a different instruction set 1409, which may include instructions to facilitate the emulation of other instruction sets. Processor core 1407 may also include other processing devices, such a Digital Signal Processor (DSP).

In some embodiments, the processor 1402 includes cache memory 1404. Depending on the architecture, the processor 1402 can have a single internal cache or multiple levels of internal cache. In some embodiments, the cache memory is shared among various components of the processor 1402. In some embodiments, the processor 1402 also uses an external cache (e.g., a Level-3 (L3) cache or Last Level Cache (LLC)) (not shown), which may be shared among processor cores 1407 using known cache coherency techniques. A register file 1406 is additionally included in processor 1402 which may include different types of registers for storing different types of data (e.g., integer registers, floating point registers, status registers, and an instruction pointer register). Some registers may be general-purpose registers, while other registers may be specific to the design of the processor 1402.

In some embodiments, one or more processor(s) 1402 are coupled with one or more interface bus(es) 1410 to transmit communication signals such as address, data, or control signals between processor 1402 and other components in the system. The interface bus 1410, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 1402 include an integrated memory controller 1416 and a platform controller hub 1430. The memory controller 1416 facilitates communication between a memory device and other components of the system 1400, while the platform controller hub (PCH) 1430 provides connections to I/O devices via a local I/O bus.

Memory device 1420 can be a dynamic random-access memory (DRAM) device, a static random-access memory (SRAM) device, flash memory device, phase-change memory device, or some other memory device having suitable performance to serve as process memory. In one embodiment the memory device 1420 can operate as system memory for the system 1400, to store data 1422 and instructions 1421 for use when the one or more processors 1402 execute an application or process. Memory controller hub 1416 also couples with an optional external graphics processor 1412, which may communicate with the one or more graphics processors 1408 in processors 1402 to perform graphics and media operations. In some embodiments a display device 1411 can connect to the processor(s) 1402. The display device 1411 can be one or more of an internal display device, as in a mobile electronic device or a laptop device or an external display device attached via a display interface (e.g., DisplayPort, etc.). In one embodiment the display device 1411 can be a head mounted display (HMD) such as a stereoscopic display device for use in virtual reality (VR) applications or augmented reality (AR) applications.

In some embodiments the platform controller hub 1430 enables peripherals to connect to memory device 1420 and processor 1402 via a high-speed I/O bus. The I/O peripherals include, but are not limited to, an audio controller 1446, a network controller 1434, a firmware interface 1428, a wireless transceiver 1426, touch sensors 1425, a data storage device 1424 (e.g., hard disk drive, flash memory, etc.). The data storage device 1424 can connect via a storage interface (e.g., SATA) or via a peripheral bus, such as a Peripheral Component Interconnect bus (e.g., PCI, PCI Express). The touch sensors 1425 can include touch screen sensors, pressure sensors, or fingerprint sensors. The wireless transceiver 1426 can be a Wi-Fi transceiver, a Bluetooth transceiver, or a mobile network transceiver such as a 3G, 4G, Long Term Evolution (LTE), or 5G transceiver. The firmware interface 1428 enables communication with system firmware, and can be, for example, a unified extensible firmware interface (UEFI). The network controller 1434 can enable a network connection to a wired network. In some embodiments, a high-performance network controller (not shown) couples with the interface bus 1410. The audio controller 1446, in one embodiment, is a multi-channel high definition audio controller. In one embodiment the system 1400 includes an optional legacy I/O controller 1440 for coupling legacy (e.g., Personal System 2 (PS/2)) devices to the system. The platform controller hub 1430 can also connect to one or more Universal Serial Bus (USB) controllers 1442 connect input devices, such as keyboard and mouse 1443 combinations, a camera 1444, or other USB input devices.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Example 1 is an apparatus supporting secure address translation services, the system comprising a memory for storage of data; and an Input/Output Memory Management Unit (IOMMU) coupled to the memory via a host-to-device link the IOMMU to perform operations, comprising receiving a memory access request from a remote device via a host-to-device link, wherein the memory access request comprises a host physical address (HPA) that identifies a physical address within the memory pertaining to the memory access request and a first message authentication code (MAC); generating a second message authentication code (MAC) using the host physical address received with the memory access request and a private key associated with the remote device; and performing at least one of allowing the memory access to proceed when the first MAC and the second MAC match and the HPA is not in an invalidation tracking table (ITT) maintained by the IOMMU; or blocking the memory operation when the first MAC and the second MAC do not match.

Example 2 includes the subject matter of Example 1, wherein the IOMMU is further to perform operations comprising receiving an initial host translation request from the remote device; in response to the initial host translation request, generating the first message authentication code (MAC) using the secret key; and returning the host physical address (HPA) and the first message authentication code (MAC) to the remote device.

Example 3 includes the subject matter of Examples 1-2, wherein the IOMMU is further to perform operations comprising in response to the initial host translation request from the remote device searching the ITT for an entry that matches the HPA and a page size for the HPA; and in response to locating an entry in the ITT that matches the HPA and the page size, removing the entry from the ITT.

Example 4 includes the subject matter of Examples 1-3, wherein the IOMMU is further to perform operations comprising receiving a request to invalidate an HPA associated with the remote device; and in response to the request, adding the HPA to the ITT.

Example 5 includes the subject matter of Examples 1-4, wherein the IOMMU is further to perform operations comprising receiving, from the remote device, a subsequent request to read an HPA, the request comprising the HPA and the MAC associated with the remote device; and in response to the request, calculating a set of MACs, wherein each MAC in the set of MACs is formatted differently.

Example 6 includes the subject matter of Examples 1-5, wherein the ITT is implemented as at least one of a direct mapped cache or a set associative cache which is split into multiple levels.

Example 7 includes the subject matter of Examples 1-6 wherein a ternary content addressable memory (TCAM) is used to track one or more ranges of invalidated HPAs in the ITT.

Example 8 is a computer-implemented method, comprising receiving a memory access request from a remote device via a host-to-device link, wherein the memory access request comprises a host physical address (HPA) that identifies a physical address within the memory pertaining to the memory access request and a first message authentication code (MAC); generating a second message authentication code (MAC) using the host physical address received with the memory access request and a private key associated with the remote device; and performing at least one of allowing the memory access to proceed when the first MAC and the second MAC match and the HPA is not in an invalidation tracking table (ITT) maintained by the IOMMU; or blocking the memory operation when the first MAC and the second MAC do not match.

Example 9 includes the subject matter of Example 8, further comprising performing operations comprising receiving an initial host translation request from the remote device; in response to the initial host translation request, generating the first message authentication code (MAC)

using the secret key; and returning the host physical address (HPA) and the first message authentication code (MAC) to the remote device.

Example 10 includes the subject matter of Examples 8-9 and further includes in response to the initial host translation request from the remote device searching the ITT for an entry that matches the HPA and a page size for the HPA; and in response to locating an entry in the ITT that matches the HPA and the page size, removing the entry from the ITT.

Example 11 includes the subject matter of Examples 8-10, wherein receiving a request to invalidate an HPA associated with the remote device; and in response to the request, adding the HPA to the ITT.

Example 12 includes the subject matter of Examples 8-11, further comprising receiving, from the remote device, a subsequent request to read an HPA, the request comprising the HPA and the MAC associated with the remote device; and in response to the request, calculating a set of MACs, wherein each MAC in the set of MACs is formatted differently.

Example 13 includes the subject matter of Examples 8-12, wherein the ITT is implemented as at least one of a direct mapped cache or a set associative cache which is split into multiple levels.

Example 14 includes the subject matter of Examples 8-13, wherein a ternary content addressable memory (TCAM) is used to track one or more ranges of invalidated HPAs in the ITT.

Example 15 is a non-transitory computer readable medium comprising instructions which, when executed by a processor, configure the processor to perform operations comprising receiving a memory access request from a remote device via a host-to-device link, wherein the memory access request comprises a host physical address (HPA) that identifies a physical address within the memory pertaining to the memory access request and a first message authentication code (MAC); generating a second message authentication code (MAC) using the host physical address received with the memory access request and a private key associated with the remote device; and performing at least one of allowing the memory access to proceed when the first MAC and the second MAC match and the HPA is not in an invalidation tracking table (ITT) maintained by the IOMMU; or blocking the memory operation when the first MAC and the second MAC do not match.

Example 16 includes the subject matter of Examples 13-15, further comprising instructions which, when executed by the processor, configure the processor to perform operations comprising receiving an initial host translation request from the remote device; in response to the initial host translation request, generating the first message authentication code (MAC) using the secret key; and returning the host physical address (HPA) and the first message authentication code (MAC) to the remote device.

Example 17 includes the subject matter of Examples 15-16, further comprising instructions which, when executed by the processor, configure the processor to perform operations comprising in response to the initial host translation request from the remote device searching the ITT for an entry that matches the HPA and a page size for the HPA; and in response to locating an entry in the ITT that matches the HPA and the page size, removing the entry from the ITT.

Example 18 includes the subject matter of Examples 15-17, further comprising instructions which, when executed by the processor, configure the processor to perform operations comprising receiving a request to invalidate an HPA associated with the remote device; and in response to the request, adding the HPA to the ITT.

Example 19 includes the subject matter of Examples 15-18, further comprising instructions which, when executed by the processor, configure the processor to perform operations comprising receiving, from the remote device, a subsequent request to read an HPA, the request comprising the HPA and the MAC associated with the remote device; and in response to the request, calculating a set of MACs, wherein each MAC in the set of MACs is formatted differently Example 20 includes the subject matter of Examples 15-19, wherein the ITT is implemented as at least one of a direct mapped cache or a set associative cache which is split into multiple levels.

Example 21 includes the subject matter of Examples 15-20, wherein a ternary content addressable memory (TCAM) is used to track one or more ranges of invalidated HPAs in the ITT.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus, comprising:
   a memory for storage of data; and
   an Input/Output Memory Management Unit (IOMMU) coupled to the memory via a host-to-device link the IOMMU to perform operations, comprising:
      receiving a memory access request from the remote device via a host-to-device link, wherein the memory access request comprises a host physical address (HPA) that identifies a physical address within the memory pertaining to the memory access request and a first message authentication code (MAC);
      generating a second message authentication code (MAC) using the host physical address received with the memory access request and a private key associated with the remote device; and
      performing at least one of:
         allowing the memory access to proceed when the first MAC and the second MAC match and the HPA is not in an invalidation tracking table (ITT) maintained by the IOMMU, wherein the ITT is implemented as at least one of a direct mapped cache or a set associative cache which is split into multiple levels; or
         blocking the memory operation when the first MAC and the second MAC do not match.

2. The apparatus of claim 1, wherein the IOMMU is further to perform operations comprising:
   receiving an initial host translation request from the remote device;
   in response to the initial host translation request, generating the first message authentication code (MAC) using the private key; and
   returning the host physical address (HPA) and the first message authentication code (MAC) to the remote device.

3. The apparatus of claim 1, wherein the IOMMU is further to perform operations comprising:
   in response to the initial host translation request from the remote device:
      searching the ITT for an entry that matches the HPA and a page size for the HPA; and
      in response to locating the entry in the ITT that matches the HPA and the page size, removing the entry from the ITT.

4. The apparatus of claim 1, wherein the IOMMU is further to perform operations comprising:
   receiving a request to invalidate the HPA associated with the remote device; and
   in response to the request, adding the HPA to the ITT.

5. The apparatus of claim 1, wherein the IOMMU is further to perform operations comprising:
   receiving, from the remote device, a subsequent request to read the HPA, the request comprising the HPA and the first MAC associated with the remote device; and
   in response to the request, calculating a set of MACs, wherein each MAC in the set of MACs is formatted differently.

6. The apparatus of claim 1, wherein a ternary content addressable memory (TCAM) is used to track one or more ranges of invalidated HPAs in the ITT.

7. A computer-implemented method, comprising:
   receiving a memory access request from a remote device via a host-to-device link, wherein the memory access request comprises a host physical address (HPA) that identifies a physical address within the memory pertaining to the memory access request and a first message authentication code (MAC);
   generating a second message authentication code (MAC) using the host physical address received with the memory access request and a private key associated with the remote device; and
   performing at least one of:
      allowing the memory access to proceed when the first MAC and the second MAC match and the HPA is not in an invalidation tracking table (ITT) maintained by the IOMMU, wherein a ternary content addressable memory (TCAM) is used to track one or more ranges of invalidated HPAs in the ITT; or
      blocking the memory operation when the first MAC and the second MAC do not match.

8. The method of claim 7, further comprising:
   receiving an initial host translation request from the remote device;
   in response to the initial host translation request, generating the first message authentication code (MAC) using the private key; and
   returning the host physical address (HPA) and the first message authentication code (MAC) to the remote device.

9. The method of claim 7, further comprising:
   in response to the initial host translation request from the remote device:
      searching the ITT for an entry that matches the HPA and a page size for the HPA; and
      in response to locating the entry in the ITT that matches the HPA and the page size, removing the entry from the ITT.

10. The method of claim 7, further comprising:
receiving a request to invalidate the HPA associated with the remote device; and
in response to the request, adding the HPA to the ITT.

11. The method of claim 10, further comprising:
receiving, from the remote device, a subsequent request to read the HPA, the request comprising the HPA and the first MAC associated with the remote device; and
in response to the request, calculating a set of MACs, wherein each MAC in the set of MACs is formatted differently.

12. The method of claim 7, wherein the ITT is implemented as at least one of a direct mapped cache or a set associative cache which is split into multiple levels.

13. A non-transitory computer readable medium comprising instructions which, when executed by a processor, configure the processor to perform operations comprising:
receiving a memory access request from a remote device via a host-to-device link, wherein the memory access request comprises a host physical address (HPA) that identifies a physical address within the memory pertaining to the memory access request and a first message authentication code (MAC);
generating a second message authentication code (MAC) using the host physical address received with the memory access request and a private key associated with the remote device; and
performing at least one of:
allowing the memory access to proceed when the first MAC and the second MAC match and the HPA is not in an invalidation tracking table (ITT) maintained by the IOMMU, wherein the ITT is implemented as at least one of a direct mapped cache or a set associative cache which is split into multiple levels; or
blocking the memory operation when the first MAC and the second MAC do not match.

14. The non-transitory computer readable medium of claim 13, further comprising instructions which, when executed by the processor, configure the processor to perform operations comprising:
receiving an initial host translation request from the remote device;
in response to the initial host translation request, generating the first message authentication code (MAC) using the private key; and
returning the host physical address (HPA) and the first message authentication code (MAC) to the remote device.

15. The non-transitory computer readable medium of claim 13, further comprising instructions which, when executed by the processor, configure the processor to perform operations comprising:
in response to the initial host translation request from the remote device:
searching the ITT for an entry that matches the HPA and a page size for the HPA; and
in response to locating the entry in the ITT that matches the HPA and the page size, removing the entry from the ITT.

16. The non-transitory computer readable medium of claim 13, further comprising instructions which, when executed by the processor, configure the processor to perform operations comprising:
receiving a request to invalidate an HPA associated with the remote device; and
in response to the request, adding the HPA to the ITT.

17. The non-transitory computer readable medium of claim 16, further comprising instructions which, when executed by the processor, configure the processor to perform operations comprising
receiving, from the remote device, a subsequent request to read the HPA, the request comprising the HPA and the first MAC associated with the remote device; and
in response to the request, calculating a set of MACs, wherein each MAC in the set of MACs is formatted differently.

18. The non-transitory computer readable medium of claim 13, wherein a ternary content addressable memory (TCAM) is used to track one or more ranges of invalidated HPAs in the ITT.

* * * * *